United States Patent [19]

Broijl et al.

[11] 4,184,313

[45] Jan. 22, 1980

[54] AGRICULTURAL IMPLEMENT COMPRISING ROTATABLE WORKING MEMBERS AND AN IMPROVED SUPPORTING MEMBER FOR THE SAME

[76] Inventors: Berend Broijl, 26, Prinses Irenestraat, Kloetinge, Netherlands; Nicolaas vanderPlas, Salvelstraat 152, Sterrebeek, Belgium

[21] Appl. No.: 685,101

[22] Filed: May 10, 1976

Related U.S. Application Data

[63] Continuation of Ser. No. 528,557, Nov. 29, 1974, abandoned.

[51] Int. Cl.² ............................................. A01D 79/00
[52] U.S. Cl. .................................................... 56/370
[58] Field of Search ......................... 56/370, 365, 377

[56] References Cited

U.S. PATENT DOCUMENTS

| | | | |
|---|---|---|---|
| 3,527,040 | 9/1970 | Teagle | 56/370 |
| 3,910,020 | 10/1975 | Spindler | 56/370 |

FOREIGN PATENT DOCUMENTS

| | | | |
|---|---|---|---|
| 248785 | 8/1966 | Austria | 56/370 |
| 1376142 | 9/1964 | France | 56/370 |

*Primary Examiner*—Jay N. Eskovitz
*Attorney, Agent, or Firm*—John P. Snyder

[57] ABSTRACT

The invention relates to an agricultural implement comprising at least one upright shaft coupled with an agricultural tractor and allowing crop working members to rotate about the same, said shaft bearing on the ground by means of a support at the lower end; the invention has for its object to provide a supporting member of comparatively light weight, whose supporting point on the ground is located at a minimum distance from the operating working members so that the working members follow the unevennesses of the ground as closely as possible; for this purpose the invention provides an agricultural implement having a dish-shaped supporting member which is arranged eccentrically with respect to the upright shaft in the direction of the operating working members.

3 Claims, 5 Drawing Figures

AGRICULTURAL IMPLEMENT COMPRISING ROTATABLE WORKING MEMBERS AND AN IMPROVED SUPPORTING MEMBER FOR THE SAME

This is a continuation of application Ser. No. 528,557 filed Nov. 19, 1974 and now abandoned.

The invention relates to an agricultural implement comprising at least one upright shaft coupled with an agricultural tractor and allowing crop working members to rotate about the same, said shaft bearing on the ground by means of a support at the lower end.

It is known to secure a ground wheel to such a shaft so as to be freely pivotable by way of supporting member, which involves drawbacks relative to the manoeuvrability of the tractor with an agricultural implement attached thereto and with respect to the required diameter of the wheel, which implies a comparatively great height of inside structure beneath the horizontally rotating working members. This is further accompanied by the drawback that crop, particularly in a wet state, may readily wind around the supporting axle of the wheel.

It is otherwise known to secure to the upright shaft on the lower side a supporting dish, which may be freely rotatable aout said shaft and which reduces the height of the inside structure, it is true, but either is exposed to a high amount of friction on the ground or has a supporting point on the ground located near the upright shaft. It has been suggested to dispose the supporting point farther away from the shaft by enlarging the dish, which may lead to enormous diameters, particularly in the case of rake members, so that the construction becomes heavier.

The invention has for its object to provide a supporting member of comparatively light weight, whose supporting point on the ground is located at a minimum distance from the operating working members so that the working members follow the unevenesses of the ground as closely as possible. For this purpose the invention provides an agricultural implement having a dish-shaped supporting member which is arranged eccentrically with respect to the upright shaft in the direction of the operating working members.

Since in accordance with the invention the supporting dish is mainly located between the upright shaft and the operating working members, the supporting member may be comparatively small. Nevertheless a satisfactory support near the working members is ensured.

In a first preferred embodiment of the invention the dish is secured near a peripheral part to the lower end of the upright shaft, whilst the diametrically opposite peripheral part is located substantially beneath the operating working members. In this embodiment the dish does not rotate freely and may be shaped in any form matching the prevailing conditions.

According to the invention the dish may be constructed so that its lowest part is located near the opposite peripheral part or, in other words, as far as possible away from the upright shaft. It is thus ensured that even in the event of a variation of the position of the upright shaft relative to the vertical the supporting point remains as near as possible to the working members.

If the operating working members are located in front of the upright shaft, viewed in the direction of movement, it is useful to flatten the peripheral part near the working members to an extent such that its centre of curvature is located near the upright shaft. This shape ensures an improved ground travel.

In a second preferred embodiment the dish has a rotationsymmetrical shape, the centre of which is adapted to rotate about a pin lying eccentrically to the upright shaft. Owing to the rotatability the friction between dish and ground is reduced, so that wear is diminished.

It may be advantageous to arrange said pin parallel to the upright shaft so that with an inclined upright shaft the pin is inclined to the same extent and the supporting point of the dish on the ground gets nearer the working members.

In some cases the pin may be at such an angle to the upright shaft that the supporting point on the ground is at any place near the working members.

Finally the invention proposes to cover the top side of the dish in order to avoid a "shoveling" effect of the dish foot.

The foregoing and further features of the invention will be set out more fully hereinafter with reference to a drawing in which FIG. 1 is a schematic side elevation of an agricultural implement comprising a first preferred embodiment of supporting member in accordance with the invention.

Figure 1:
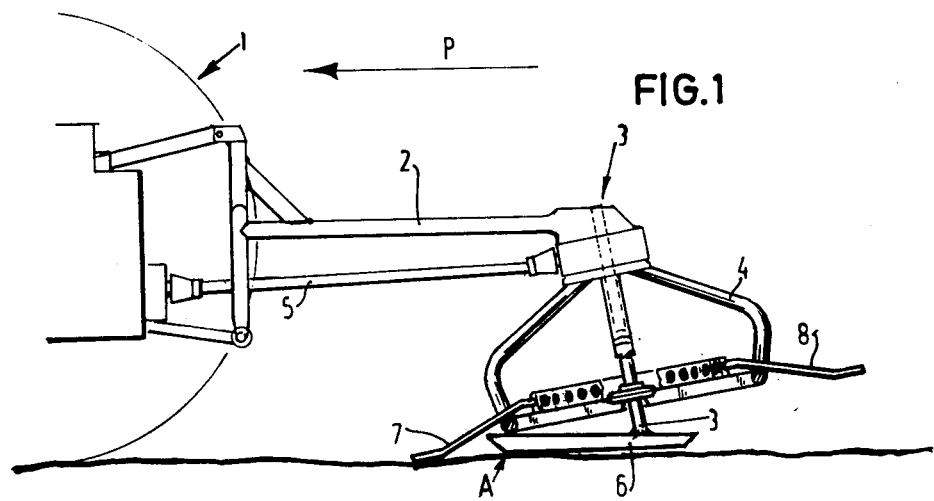

The agriculutral implement shown comprises a frame 2, coupled with an agricultural tractor 1, only the rear wheel and the threepoint lift of which are shown schematically, said frame having at least one upright shaft 3. About this upright shaft 3 is rotatably driven a working member, for example, a rake wheel 4 with the aid of the power take-off shaft 5 of the tractor 1.

Figure 2:
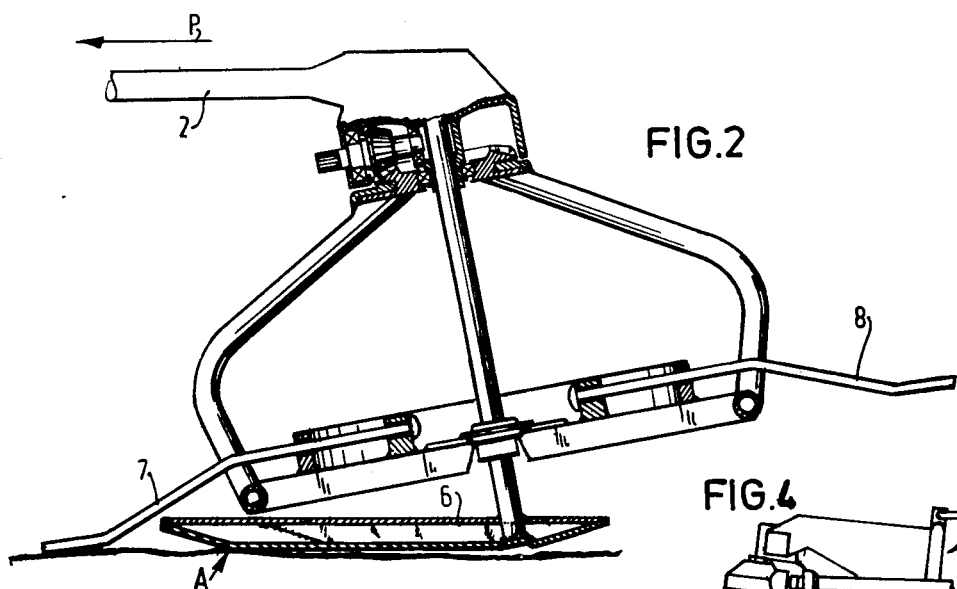
FIG. 2 is a vertical sectional view of the upright shaft of the agricultural implement shown in FIG. 1 on an enlarged scale.
Figure 3:
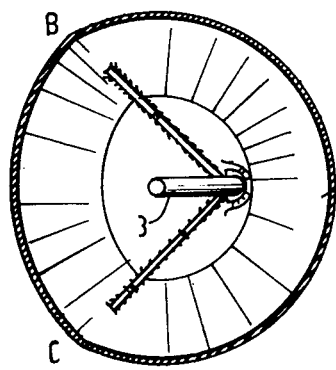
FIG. 3 is a plan view of the improved supporting member in accordance with the invention.

The lower end of the upright shaft 3 is provided with a first preferred embodiment of the supporting member 6 in accordance with the invention the details of which are illustrated on an enlarged scale in FIGS. 2 and 3. The dish-shaped supporting member 6 is eccentrically arranged at the lower end of the upright shaft 3 so that the supporting point A of the dish on the ground constitutes the lowermost point of the dish.

It will be obvious that when the upright shaft 3 is adjusted into a more or less forwardly inclined position, the whole implement will tilt about the point A. This point A is located nearer the active tines 7 than the inoperative tines 8, which results in that even in the permissible most strongly inclined position of the upright shaft 3 the tines will not touch the ground.

From FIG. 3 it will be apparent that the front edge of the dish is flattened along the portion B, C, while the top side of the dish is covered by a plate so that in operation the dish cannot pick up earth.

Figure 4:
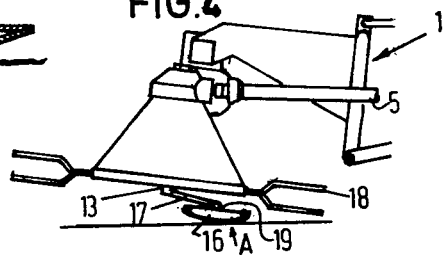
FIG. 4 is a schematic side elevation of an agricultural implement comprising a second, preferred embodiment of the supporting member.
Figure 5:
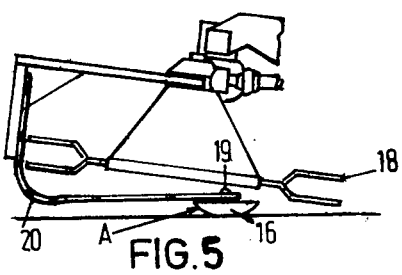
FIG. 5 shows a variant of the second preferred embodiment.

FIGS. 4 and 5 show a second, preferred embodiment of the invention mainly characterized in that the dish 16 has a rotationsymmetrical structure and is rotatably arranged on a pin 19 arranged eccentrically to the upright shaft.

FIG. 4 shows the pin 19 directly secured to the lower side of the upright shaft by means of a support 17.

FIG. 5 however, shows the pin 19 secured to a support 20, which extends around a rotatable working member and which is coupled at the other end with a supporting part of the frame of the implement.

In dependence upon the position of the pin 19 the lowermost point A will be located more or less eccentrically beneath the dish (see FIGS. 4 and 5). By selecting a correct angle of inclination of the pin 19, the point a can be disposed more or less near the active working members 8.

Finally it should be noted that the upright shaft 3 can be adjusted to a more or less inclined position by adjusting the three-point lift of the tractor 1 to a higher or lower level.

Within the scope of the invention the dish may extend alternatively more to one side than to the front and, if desired, even to the rear in accordance with the nature and the position of the working members. The lowermost point A will then take up a matching position.

What is claimed is:

1. In an agricultural implement having a frame adapted to be attached to a powered vehicle, a shaft fixed to and depending downwardly from said frame, a cropworking member rotatably supported by aid shaft, said member having a plurality of generally radially projecting teeth which sweep through a path which at a point displaced radially from said axis is closest to the ground surface, the improvement which comprises a generally horizontally disposed, dish-like groundengaging member disposed beneath said crop-working member and displaced from said axis in a direction toward said point whereby said ground-engaging member engages the ground near said point so as to allow the implement closely to follow ground contour without causing said point to engage the ground, said dishlike member being of generally circular plan view and being fixed adjacent one peripheral edge thereof to said shaft with the opposite peripheral edge thereof being disposed closely adjacent said point and said dish-like member having a substantially flat bottom lying in a plane at an acute angle to said shaft and extending from said shaft to adjacent said point.

2. In an agricultural implement as defined in claim 11 wherein said opposite peripheral edge of the dish-like member is flattened to present a radius of curvature substantially centered with respect to the lower end of said shaft.

3. In an agricultural implement as claimed in claim 2, characterized in that the center of curvature of said opposite peripheral edge is located near the point at which said shaft joins said ground-engaging member.

* * * * *